United States Patent [19]

Stotland

[11] Patent Number: 4,948,372
[45] Date of Patent: Aug. 14, 1990

[54] TENNIS INSTRUCTIONAL AID AND METHOD

[76] Inventor: Duane Stotland, 1813 Lemhi, Boise, Id. 83705

[21] Appl. No.: 321,387

[22] Filed: Mar. 10, 1989

[51] Int. Cl.⁵ .................. G09B 19/00; A63B 69/38
[52] U.S. Cl. .................................... 434/247; 434/255; 273/29 R; 273/29 A; 273/30; 273/31
[58] Field of Search .............. 434/247, 248, 250, 251, 434/255; 273/29 A, 29 R, 30, 31

[56] References Cited

U.S. PATENT DOCUMENTS

| | | | |
|---|---|---|---|
| 1,277,645 | 9/1918 | Rothkugel | 434/250 |
| 2,458,984 | 1/1949 | Engle | 434/251 |
| 3,117,783 | 1/1964 | Reid | 273/30 |
| 3,874,664 | 4/1975 | Faurot et al. | 273/29 A |
| 3,982,758 | 9/1976 | Howes, Jr. | 273/29 R |
| 4,023,798 | 5/1977 | Pronin | 434/247 |
| 4,047,308 | 9/1977 | Wheeler | 434/251 |

FOREIGN PATENT DOCUMENTS 284869  2/1928  United Kingdom ............... 434/250

Primary Examiner—William H. Grieb
Assistant Examiner—Valerie Szczepanik
Attorney, Agent, or Firm—Frank J. Dykas; Craig M. Korfanta

[57] ABSTRACT

Tennis gauge 10 uses a plurality of adhesive dots 11 and 12 to teach relative positioning of a tennis player on tennis court 1 with respect to the bouncing point of a ground stroked tennis ball. First indicia adhesive dots 11 are positioned along service box centerlines 7 nine feet fore and aft service line 4. Second indicia adhesive dots 12 are attached along the longitudinal service box centerline 7 at points nine feet aft base lines 6. Tennis player uses the adhesive dots to indicate the relative distance behind the bouncing point of a ground stroked tennis ball for the return stroke.

12 Claims, 7 Drawing Sheets

TENNIS INSTRUCTIONAL AID AND METHOD

BACKGROUND OF THE INVENTION

1. Technical Field

This invention generally relates to a sport's instructional aid and in particular it relates to an instructional aid, used on the tennis court, for teaching the proper positioning of a tennis player relative to the bounce of the tennis ball.

2. Background Art

Most athletic endeavors, whether team sports or individual sports, involve being at the right place at the right time. Tennis is no exception. A tennis player must judge the bounce of the tennis ball relative to its origin and adjust his position accordingly so that he can return the stroked ball.

Assuming that the most desireable stroke in returning a tennis ball is a level, waist high, stroke, the player must position himself relative to the bounce of the tennis ball such that the tennis ball will be at the right height for the return stroke.

ENGLE, U.S. Pat. No. 2,458,984 teaches a football instructing device. The device is intended for use by running backs practicing pre-planned movement as required by particular plays. The device essentially takes the place of other players by indicating their relative positions on the playing field.

A particular tennis instructional aid is taught by DOMBROWSKI, ET AL., U.S. Pat. No. 4,711,633. Dombrowski teaches a layered wheel calculator for identifying stroke and grip problems. The tennis player uses the calculator to correlate potential problem sources with the undesirable result they are experiencing. It does not teach positioning.

In tennis, the return of a ball that has bounced on the player's side of the court is called a ground stroke. The optimum distance behind the bounce point of a tennis ball, which corresponds to the longitudinal range in which the tennis ball is at waist height in its trajectory, is dependent upon three factors. Neglecting air resistance, the factors are: initial velocity, angle of trajectory and spin. Obviously, there is a great deal of interrelation between the three factors. A tennis ball ground stroked from deep in the opposing player's court will require a high velocity and a corresponding smaller angle of trajectory to clear the net and at the same time stay in bounds. If the player were to use a top spin shot in hitting the deep ground stroke, he could increase both the initial velocity and angle of trajectory while still keeping the ball in play. Obviously, novice players cannot afford to be overly concerned with trying to analyze the opposing player's distance away from the net, initial velocity, trajectory angle and the spin on the tennis ball. Most novice players are simply trying to get the ball over the net while keeping it in bounds.

What is needed is an instructional aid which demonstrates to the tennis player the proper positioning behind the bounce point of a ground stroked tennis ball for the return stroke.

It is therefore an object of the present invention to provide a tennis instructional aid which a novice player, or any player wishing to improve his or her game, can use to insure optimum positioning behind the bounce point of a ground stroked tennis ball.

DISCLOSURE OF INVENTION

The present invention is a result of a great deal of observation and subsequent experimentation. It was observed by the present inventor that in returning an overwhelming majority of ground stroked tennis balls, the optimum positioning behind the bounce point of the tennis ball remains fairly constant. In fact, experimentation has shown that there exist two optimum distances, i.e. one for returning a stroke hit from the service line area and a second for returning a stroke hit from the base line area.

These two distances, the first being nine feet and the second being eighteen feet, each correspond to the general location of the most statistically probable point where the bouncing tennis ball will be the proper distance above the playing surface for a waist level return stroke.

It has been found, especially with most tennis players, that these optimum return distances are extremely predictable. Obviously, as the players get better and are able to vary the initial velocity, angle of trajectory and spin on the ball, the optimum return distance will have to be adjusted accordingly.

The present invention uses adhesive dots having diameters approximately the size of a tennis ball which are affixed to specific locations on the tennis court playing surface. For returning short ground strokes, a first plurality of dots are attached along the longitudinal centerline of each service box and nine feet in front of the service line. Hence, a player would position himself on the service line directly behind the bouncing point of a short ground stroke hit by the opposing player, where the bouncing point lies along an imaginary transverse line disposed parallel to the net and passing through a first dot.

Please refer to FIG. 1 for the following examples. For a ball ground stroked from the service line of the opposing player and bouncing at a point on the imaginary transverse line, say X, statistically the optimum point for returning the ball is at the point of intersection between the path of the ball and the imaginary transverse line X', which lies nine feet behind X. Similarly, a ball bouncing one foot behind X on the imaginary transverse line Y, should be returned from a point where the path of the ball intersects the imaginary transverse line Y', which lies one foot behind X'. The same is true for Z, lying two feet behind X, and Z' lying two feet behind X'. Obviously, if the angle of the path of the ball deviates too severely with respect to the centerline, the optimum point of return is nine feet behind the bounce point measured along the path of the ball. However, this type of shot is very uncommon with novice players.

For returning a long ground stroke, a first and second plurality of adhesive dots are again attached along the two longitudinal service box centerlines, but this time the first plurality of dots are located at points nine feet in front of the baseline and while the second plurality are nine feet aft the baseline. Accordingly, the optimum distance behind the bounce point of a ground stroke hit from the baseline of the opposing player and landing on the dot in front of the baseline would be the dot nine feet behind the baseline. The same ground stroke hit by the opposing player landing on the baseline would be returned from a point eighteen feet behind the bounce point and along an imaginary transverse line parallel to the net and intersecting the dot nine feet aft of the baseline.

Refer now to FIG. 2 for the following examples. For a ball ground stroked from the general vicinity of the opposing player's base line and landing on the dot lying on the imaginary transverse line P, nine feet in front of the other base line, the optimum point of return is the location of the second dot, which lies on the imaginary line P'. A ball bouncing on line Q, lying one foot behind P, would have an optimum return point located at the intersection of the path of the ball and the imaginary transverse line Q', lying one foot behind P'. Analogously, the optimum return point for returning a long ground stroke bouncing at a point lying on the imaginary transverse line R, lying one foot behind Q, is at the intersection of the path of the ball and the imaginary transverse line R'.

Obviously, few tennis balls will bounce exactly on the dot or even exactly on the transverse line intersecting the dot. Accordingly, the player uses the dots to adjust his position relative to the bounce point of the ground stroked tennis ball by visualizing the correct distance behind the ball's bounce for the optimum return.

BEST MODE FOR CARRYING OUT INVENTION

Figure 1:
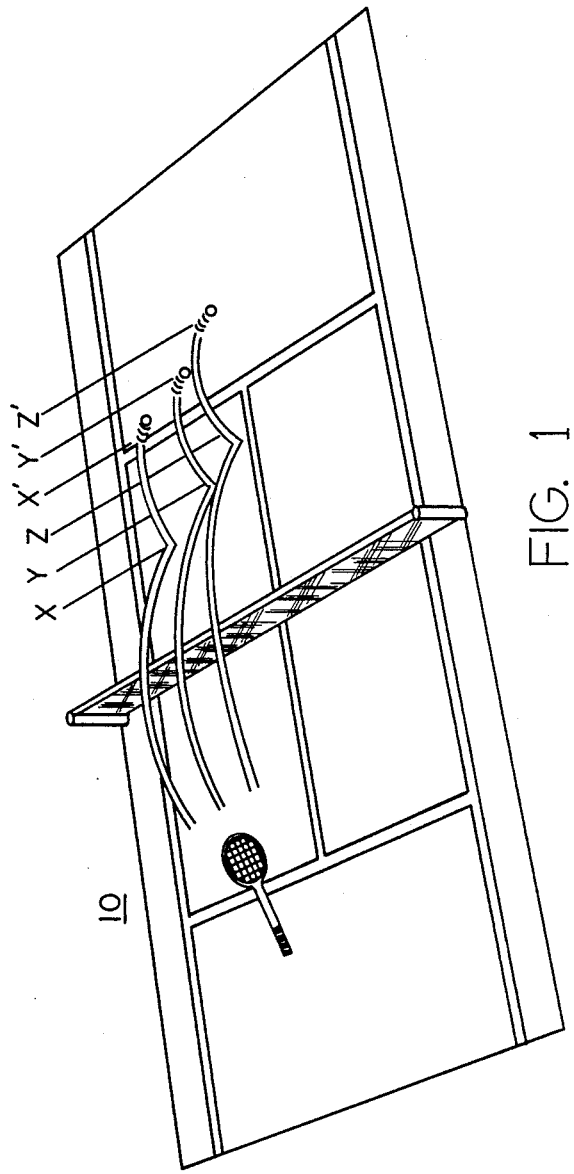
FIG. 1 is an elevation view of a tennis court showing the most probable return distances for a short ground stroke.
Figure 2:
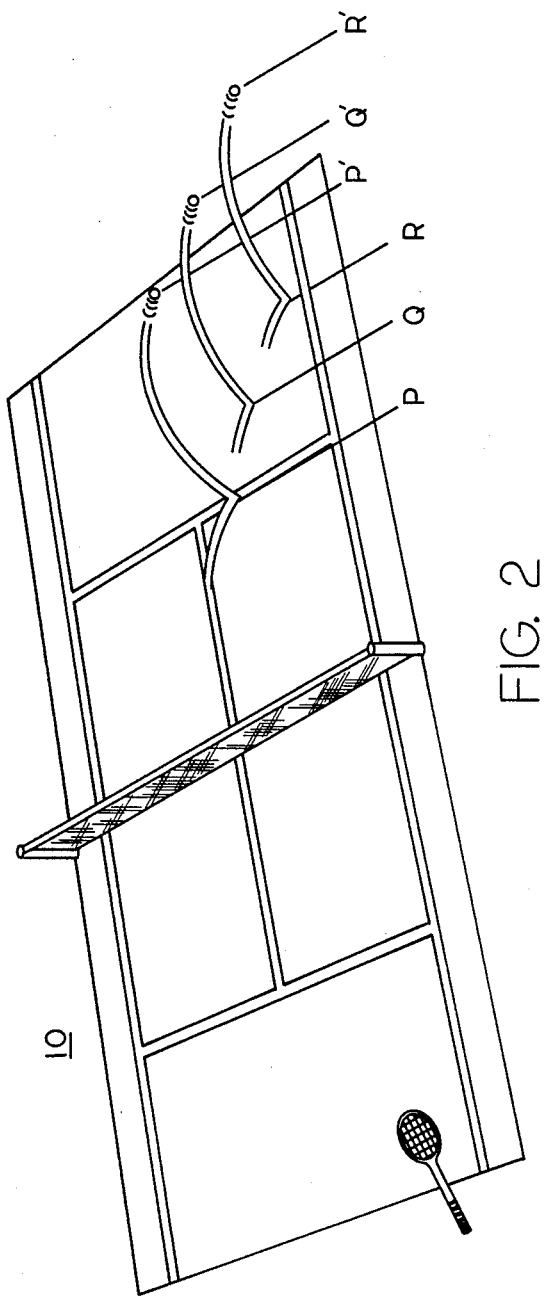
FIG. 2 is an elevation view of a tennis court showing the most probable return distances for a long ground stroke.
Figure 3:
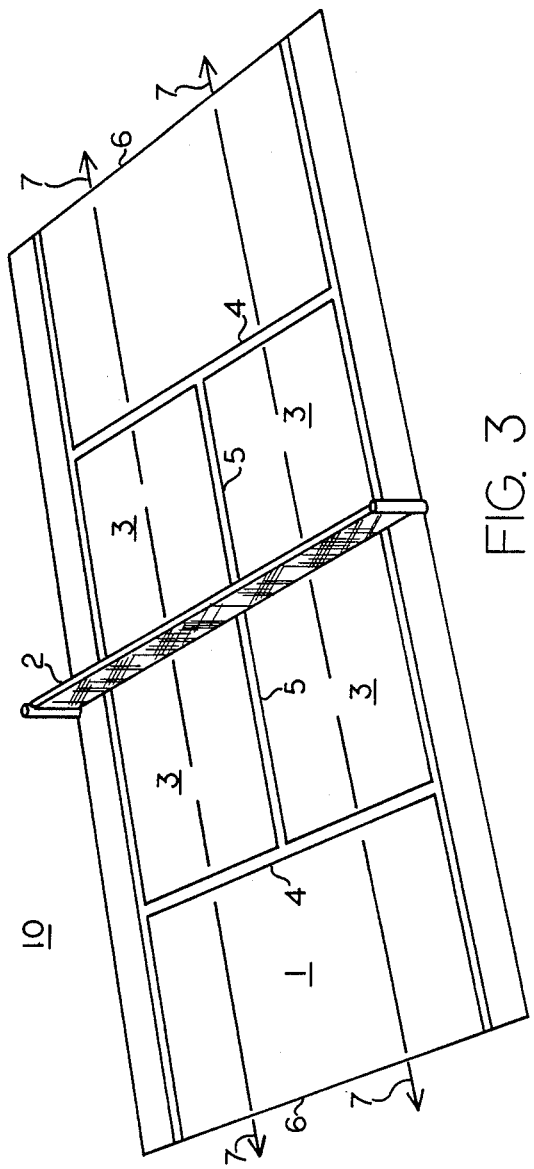
FIG. 3 is an elevation view of a typical tennis court.

Referring now to FIG. 3, a typical tennis court is shown, designated as 1 and also generally refers to the playing surface. Tennis court 1 here has net 2 separating opposing courts, which each contain a pair of service boxes 3, each having a service line 4. Main centerline 5 separates service boxes 3. The opposing courts are each defined at there rear by base lines 6. Each service box 3 here has an imaginary longitudinal centerline 7 symmetrically bisecting its area and running the entire length of the playing surface.

Figure 4:
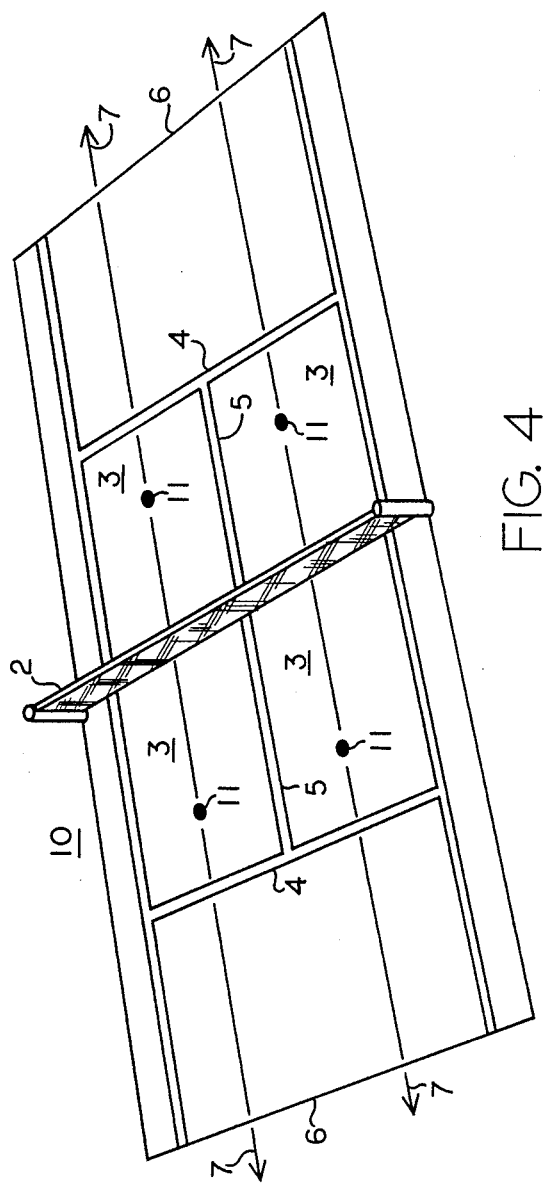
FIG. 4 is an elevation view of a tennis court and the tennis gauge.

Referring now to FIG. 4, a first embodiment of my invention is shown, here named the tennis gauge, and designated as 10. Tennis gauge 10 has four round adhesive dots 11, constituting a first indicia means, one each affixed in separate service boxes 3 at a point along longitudinal service box centerlines 7 nine feet in front of service line 4.

Figure 5:
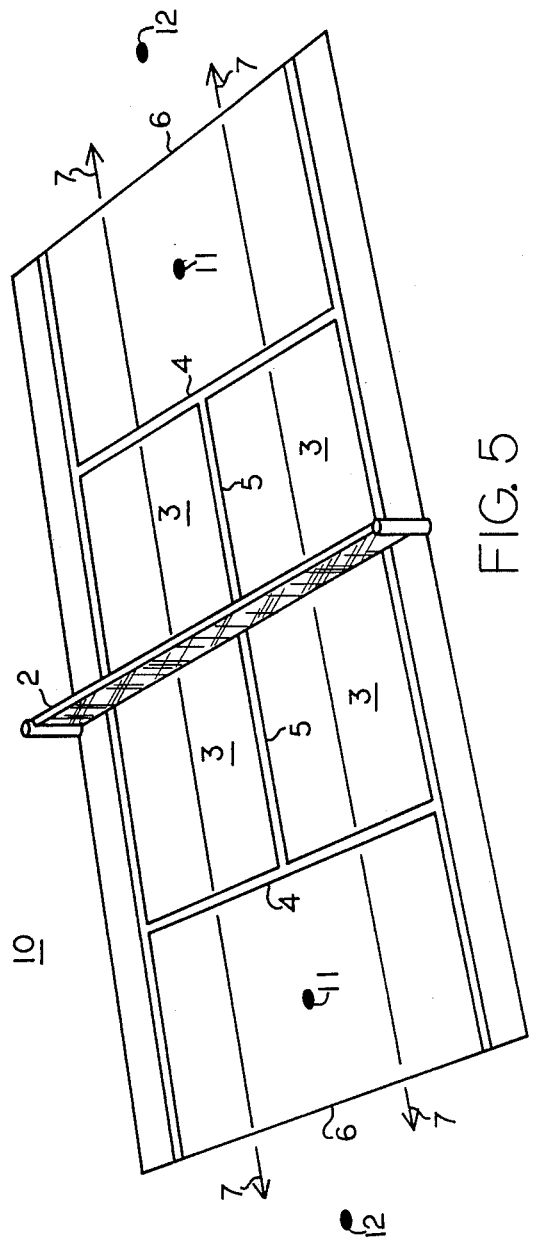
FIG. 5 is an elevation view of a tennis court and a second embodiment of the tennis gauge.

Referring now to FIG. 5, a second embodiment is shown. Here, first indicia 11 are affixed nine feet in front of base line 6 on an imaginary line which lies coincident main centerline 5 while second indicia 12, again consisting of round adhesive dots, are affixed nine feet in back of base lines 6 and again on an imaginary line which lies coincident main centerline 5.

Figure 6:
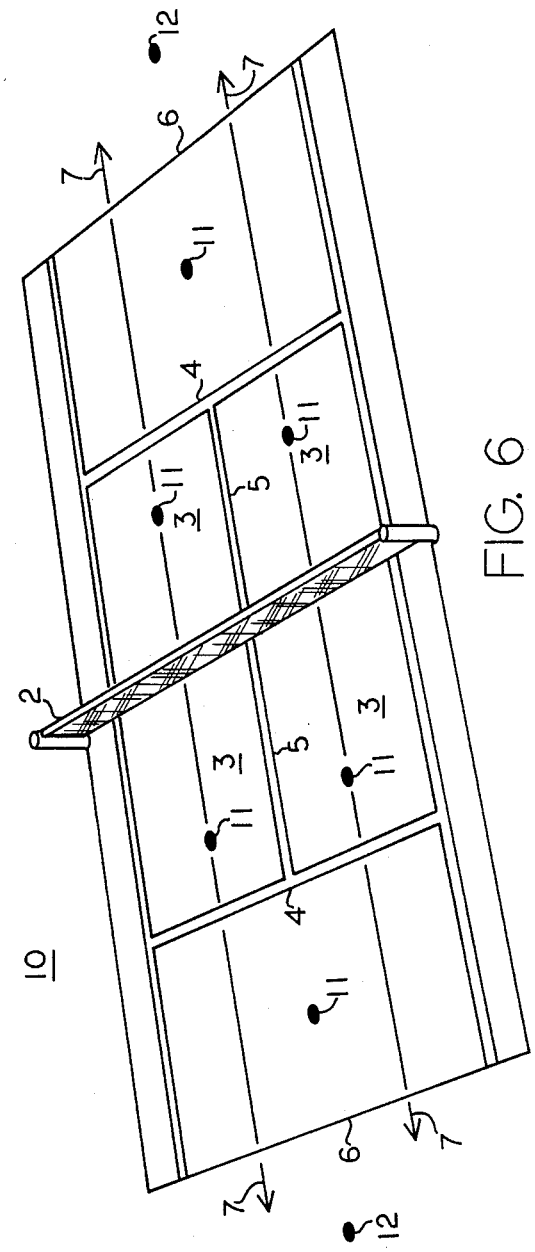
FIG. 6 is an elevation view of a tennis court having both the first and second embodiments of the tennis gauge installed thereon.

In use, a tennis instructor might choose to use both the first and second embodiments of the present invention on tennis playing surface 1 at the same time as is shown in FIG 6. For returning a short ground stroke, bouncing on a transverse line intersecting first indicia 11, a player would position himself on the service line 4 directly behind the bouncing point of the ball. If on the other hand the ball bounced one foot behind the transverse line then the player would position himself one foot behind service line 4. Similarly, for returning a long ground stroke bouncing at first indicia 11 located nine feet fore of base line 6, a player would position himself directly behind the bounce point at the second indicia 12.

Figure 7:
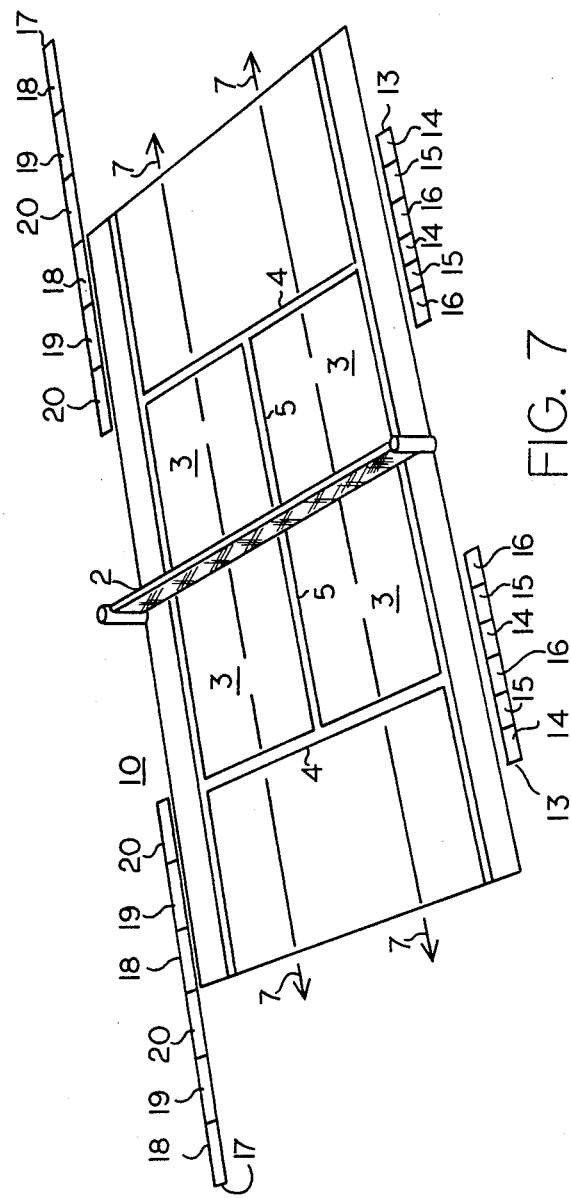
FIG. 7 is an elevation view of a tennis court and a third embodiment of the tennis gauge.

Referring now to FIG. 7 a third embodiment of tennis gauge 10 is shown which uses repeating color coded strips 13 and 17. Repeating color coded strips 13 consists of rectangular 3 foot strip segments 14, 15 and 16, each being of a unique color. Color coded strips 13 are affixed to tennis court 1 and is disposed along one side. In this preferred embodiment, segment 14 is red while segment 15 is blue and segment 16 is green. In this manner, the red-blue-green color code repeats every nine feet. Therefore, a ball bouncing within the transverse zone defined by red segment 14 which is adjacent service line 4 would be returned from the red segment 14 transverse zone between base line 6 and service line 4. A "transverse zone" is here defined as a rectangular area lying parallel to base lines 6 and having a width defined by the continguous color segment.

Repeating color coded strips 17 are each positioned parallel to the tennis court sidelines and bisected by base lines 6. Repeating color coded strips 17 consist of rectangular six foot colored segments 18, 19 and 20 connected end to end. Here, color segment 18 being red, while color segment 19 is blue and color segment 20 is green. Repeating color code strips 17 are used analogously by the tennis player.

The players use the various indicia to visualize the relative optimum distances behind the bounce point of the tennis ball for the return stroke, thereby greatly enhancing and accelerating their level of play.

While there is shown and described the present preferred embodiment of the invention, it is to be distinctly understood that this invention is not limited thereto but may be variously embodied to practice within the scope of the following claims.

We claim:

1. A tennis instructional aid which comprises:
   a tennis court, including a tennis playing surface having a net, a service line and a service box; and
   a plurality of position locating indicia being attached to particular points on the tennis playing surface which correspond to the most statistically probable distance behind the net that a ground stroked tennis ball will impact with the playing surface and to the statistically optimum hitting position behind the net for a player returning the ground stroked tennis ball, for indicating the relative positioning of a tennis player with respect to the location of the bounce of a ground stroked tennis ball.

2. The tennis instructional aid of claim 1 wherein said plurality of position locating indicia comprises pairs of indicia wherein a first indicia of any given pair is positioned on the playing surface at a point behind the tennis net which corresponds to the most statistically probable bouncing point of a ground stroked tennis ball, and further wherein the second indicia of any given pair is positioned on the playing surface at a point behind said first indicia which corresponds to the optimum hitting position for a player returning the most probable ground stroked tennis ball.

3. The tennis instructional aid of claim 2 wherein said first indicia is positioned on the playing surface at a point behind the net and nine feet in front of the service line and along a service box centerline.

4. The tennis instructional aid of claim 3 wherein said first and second indicia comprise round dots having adhesive on one side and a diameter approximately equal to that of a tennis ball.

5. The tennis instructional aid of claim 2 wherein said first indicia is positioned on the playing surface at a point nine feet behind the service line and 6. The tennis instructional aid of claim 1 wherein said plurality of locating indicia comprises a strip of material having rectangular colored segments and being arranged in a repeating color code having three distinct colors.

7. The tennis instructional aid of claim 6 wherein said rectangular segments are three feet in length.

8. The tennis instructional aid of claim 6 wherein said rectangular segments are six feet in length.

9. A tennis instructional aid which comprises:
   a tennis court, including a tennis playing surface having a net, a service line and a service box; and
   a plurality of round dots having adhesive on one side and a diameter approximately equal to that of a tennis ball, being attached to particular points on a tennis playing surface at distances of approximately nine and eighteen feet behind the net, which correspond to the most statistically probable distance behind the net that a ground stroked tennis ball will impact with the playing surface and to the statistically optimum hitting position behind the net for a player returning the ground stroked tennis ball, for indicating the relative positioning of a tennis player with respect to the location of the bounce of a ground stroked tennis ball.

10. A method of teaching relative positioning of a tennis player with respect to the bounce of a ground stroked tennis ball on a tennis court having a net, a service line, a service box and a base line, comprising the steps of:
    A) attaching a first locating indicia to a point on the tennis court playing surface at a known distance behind the net which corresponds to the most statistically probable distance behind the net that a ground stroked tennis ball will impact with the playing surface;
    B) attaching a second locating indicia to a point on the tennis court playing surface behind said first indicia which corresponds to the statistically optimum hitting position behind the net for a player returning the ground stroked tennis ball; and
    C) adjusting the player's hitting position relative to said second indicia according to the point of impact on the tennis court of the ground stroked tennis ball relative to said first indicia.

11. The method of claim 10 wherein step A) further comprises attaching an adhesive dot approximately the size of a tennis ball to a point along a centerline of the service box and nine feet in front of the service line.

12. The method of claim 10 wherein step A) further comprises attaching a first adhesive dot, being approximately the size of a tennis ball, to a point on a centerline of the service box nine feet in front of the base line, and step B) further comprises attaching a second adhesive dot, being approximately the size of a tennis ball, to a point on the centerline of the service box nine feet behind the baseline.

* * * * *